3,271,429
PROCESS FOR PREPARATION OF 20-KETOXIMES OF $\Delta^{16}$-20-KETO-PREGNENES
Octavio Mancera, Mexico City, Mexico, assignor to Syntex Corporation, Panama, Panama, a corporation of Panama
No Drawing. Filed Oct. 29, 1964, Ser. No. 407,554
Claims priority, application Mexico, Nov. 26, 1963, 74,766
3 Claims. (Cl. 260—397.5)

The present invention relates to a process for preparing certain cyclopentanophenanthrene derivatives.

More particularly, it relates to a process for preparing the 20 - ketoximes of $\Delta^{16}$ - 20 - keto - pregnenes by direct treatment of the total product of the degradation of steroidal sapogenins with hydroxylamine - hydrochloride in the presence of a weak base.

It is known to those skilled in the art, that said oximes are important precursors for the preparation of androgenic and estrogenic hormones from compounds having the pregnane side chain. The known methods for the preparation of these oximes comprise the reaction of a $\Delta^{16}$ - 20 - keto - pregnene with hydroxylamine hydrochloride in alcohol solution and in the presence of dehydrohalogenating agent which takes up the hydrogen chloride liberated during the reaction, using preferably purpose.

In U.S. Patent No. 3,108,123 there was described an improvement to these methods, specifically for the preparation of the oxime of 16 - dehydro - pregnenolone, which comprises reacting the acetate of $\Delta^{5,16}$ - pregnadien - 3$\beta$-ol-20-one with hydroxylamine hydrochloride in ethanol suspension and in the presence of solid calcium carbonate.

In general the $\Delta^{16}$ - 20 - keto - pregnenes used as starting materials in the methods above mentioned are obtained from steroidal sapogenins, by the conventional method of degradation of the sapogenin side chain, i.e., by heating with acetic anhydride to produce the furostene derivative, which upon oxidation with chromium trioxide in acidic medium gave rise a mixture of the $\gamma$-methyl-$\delta$-acetoxy valerate of the 16 - hydroxy - 20 - keto - pregnane (diosone) and the $\Delta^{16}$-20-keto-pregnene. This mixture is known as "total product of sapogenin degradation" and it is converted into the last mentioned compound exclusively, by alkaline treatment.

In accordance with the present invention the surprising discovery has been made that by direct treatments of the "total product of sapogenin degradation" with hydroxylamine hydrochloride in the presence of calcium carbonate there is also obtained the corresponding oxime, thus avoiding the alkaline treatment which presents, as disadvantages, the formation of secondary products such as 16-alkoxy compounds when the reaction is effected in an alcoholic solvent, and the partial hydrolysis of the acyloxy group at C-3. Consequently the isolation of the $\Delta^{16}$-20-keto-pregnene and its purification are also avoided. This method is especially useful for its applicability to large scale operations.

In practicing the process outlined above we started from a mixture of a 3 - acyloxy - 16 - $\gamma$ - methyl - $\delta$ - acyloxy - valerate of a 20 - keto - pregnene ("diosone") with a $\Delta^{16}$-20-keto-pregnene, i.e. the total product of the degradation of sapogenins such as diosgenin, tigogenin, smilagenin, epismilagenin, sarsasapogenin and the like. This mixture is reacted with hydroxylamine hydrochloride in an alcoholic solvent such as methanol or ethanol and in the presence of carbonates or oxides of alkaline earth metals slightly soluble in the solvent used, such as for example calcium carbonate, magnesium carbonate, magnesium oxide, etc., thus producing the corresponding 20-ketoxime. The reaction is conducted under vigorous stirring at reflux temperature and for a period of time of between 1 to 5 hours, preferably for 3 hours. The carbonate or oxide used is destroyed by the addition of hydrochloric acid and the precipitated oxime is separated by filtration.

The yields of 20-ketoxime obtained by this method taking as weight of starting material the weight of sapogenin are superior to the yields obtained when the intermediate $\Delta^{16}$-20-keto is isolated.

The following specific examples serve to illustrate but are not intended to limit the scope of the present invention.

*Example I*

To a stirred solution of 440 g. of the total product of the degradation of diosgenin (mixture of the acetate of 16 - ($\gamma$ - methyl - $\delta$ - acetoxy) valerate of $\Delta^5$ - pregnene-3$\beta$,16 - diol - 20 - one and the acetate of 16 - dehydropregnenolone) in 1300 cc. of 90% alcohol there was added 57 g. of finely divided calcium carbonate and then 62 g. of hydroxylamine hydrochloride in portions, maintaining the temperature between 40–50° C. The reaction mixture was refluxed for two and a half hours with vigorous stirring, cooled to room temperature and treated dropwise with 45 cc. of concentrated hydrochloric acid to dissolve the excess calcium carbonate, stirring the mixture for 30 minutes further.

The solid was filtered off and the filtrate distilled to recover the alcohol which may be used again in further experiments.

The precipitate was washed successively with alcohol, hot water and heptane and dried at 70° C. under vacuo for 4 hours, thus yielding 234 g. of the oxime of the acetate of $\Delta^{5,16}$ - pregnadien - 3$\beta$ - ol - 20 - one, M.P. 220–223° C., identical to an authentic sample.

*Example II*

In the method of the preceding example calcium carbonate was substituted by magnesium oxide to produce also the oxime of the acetate of 16-dehydropregnenolone in similar yield.

*Example III*

In the method of Example I calcium carbonate was substituted by magnesium carbonate and the reflux period was extended to 5 hours, with similar results.

*Example IV*

Example I was repeated but using the total product of tigogenin degradation as starting material, to produce the oxime of the acetate of $\Delta^{16}$-allopregnen-3$\beta$-ol-20-one.

*Example V*

Example I was repeated but using as starting material the total product of epismilagenin degradation (mixture of the acetate of 16 - ($\gamma$ - methyl - $\delta$ - acetoxy) valerate of pregnane - 3$\alpha$,16 - diol - 20 - one and the acetate of $\Delta^{16}$ - pregnen - 3$\alpha$ - ol - 20 - one), to produce the oxime of the acetate of $\Delta^{16}$-pregnen-3$\alpha$-ol-20-one.

I claim:
1. A process for preparing the 20 - ketoxime of $\Delta^{16}$- pregnene compounds, which comprises treating the total product of the degradation of sapogenins, consisting of a mixture of a 3 - acyloxy - $\gamma$ - methyl - $\delta$ - acyloxy valerate of a 20-keto 16-hydroxy pregnane and a $\Delta^{16}$-20-keto pregnene, with hydroxylamine hydrochloride in an alcoholic solvent and in the presence of a weak alkaline salt selected from the group consisting of carbonates and oxides of alkaline earth metals.

2. The process of claim 1 wherein the salt used is calcium carbonate.

3. The process of claim 1 wherein the starting material used is the total product of the degradation of diosgenin, and the product obtained is the oxime of the acetate of $\Delta^{5,16}$-pregnadien-3$\beta$-ol-20-one.

No references cited.

LEWIS GOTTS, *Primary Examiner.*

HENRY A. FRENCH, *Assistant Examiner.*